(12) United States Patent
Shieh et al.

(10) Patent No.: US 10,158,672 B2
(45) Date of Patent: Dec. 18, 2018

(54) CONTEXT AWARE MICROSEGMENTATION

(71) Applicant: vArmour Networks, Inc., Mountain View, CA (US)

(72) Inventors: Choung-Yaw Shieh, Palo Alto, CA (US); Jia-Jyi Lian, Saratoga, CA (US); Yi Sun, San Jose, CA (US); Meng Xu, Los Altos, CA (US)

(73) Assignee: vArmour Networks, Inc., Mountain View, CA (US)

( * ) Notice: Subject to any disclaimer, the term of this patent is extended or adjusted under 35 U.S.C. 154(b) by 0 days.

(21) Appl. No.: 15/255,132

(22) Filed: Sep. 1, 2016

(65) Prior Publication Data
US 2017/0063933 A1    Mar. 2, 2017

Related U.S. Application Data

(63) Continuation of application No. 14/839,649, filed on Aug. 28, 2015, now Pat. No. 9,467,476.

(51) Int. Cl.
*H04L 29/06* (2006.01)
*G06F 21/55* (2013.01)
*G06F 9/455* (2018.01)

(52) U.S. Cl.
CPC .......... *H04L 63/20* (2013.01); *G06F 9/45558* (2013.01); *G06F 21/55* (2013.01);
(Continued)

(58) Field of Classification Search
CPC .................................................... H04L 63/107
See application file for complete search history.

(56) References Cited

U.S. PATENT DOCUMENTS

| | | |
|---|---|---|
| 6,226,372 B1 | 5/2001 | Beebe et al. |
| 6,765,864 B1 | 7/2004 | Natarajan et al. |

(Continued)

FOREIGN PATENT DOCUMENTS

| | | |
|---|---|---|
| TW | 201702901 A | 1/2017 |
| WO | WO2016148874 A1 | 9/2016 |
| WO | WO2017040148 A1 | 3/2017 |
| WO | WO2017040205 A1 | 3/2017 |

OTHER PUBLICATIONS

Patent Cooperation Treaty Application No. PCT/US2016/048412, "International Search Report" and "Written Opinion of the International Searching Authority," dated Nov. 4, 2016, 10 pages.

(Continued)

*Primary Examiner* — Jason K Gee
(74) *Attorney, Agent, or Firm* — Carr & Ferrell LLP

(57) ABSTRACT

Context aware microservice networks and contextual security policies for microservice networks are provided herein. In some embodiments, a system includes a plurality of microservices, each of the plurality of microservices having a plurality of distributed microservice components. At least a portion of the distributed microservice components execute on different physical or virtual servers in a data center or a cloud. The system also includes a plurality of logical security boundaries, with each of the plurality of logical security boundaries being created by a plurality of enforcement points positioned in association with the plurality of distributed microservice components. Each of plurality of microservices is bounded by one of the plurality of logical security boundaries.

27 Claims, 8 Drawing Sheets

(52) U.S. Cl.
CPC ........ *H04L 63/0254* (2013.01); *H04L 63/107* (2013.01); *H04L 63/1408* (2013.01); *G06F 2009/45587* (2013.01); *G06F 2009/45595* (2013.01)

(56) References Cited

U.S. PATENT DOCUMENTS

| | | |
|---|---|---|
| 6,986,061 B1 | 1/2006 | Kunzinger |
| 6,992,985 B1 | 1/2006 | Das |
| 7,058,712 B1 | 6/2006 | Vasko et al. |
| 7,062,566 B2 | 6/2006 | Amara et al. |
| 7,068,598 B1 | 6/2006 | Bryson et al. |
| 7,502,841 B2 | 3/2009 | Small et al. |
| 7,607,170 B2 | 10/2009 | Chesla |
| 7,620,808 B2 | 11/2009 | Le et al. |
| 7,735,141 B1 | 6/2010 | Noel et al. |
| 7,774,837 B2 | 8/2010 | McAlister |
| 7,849,495 B1 | 12/2010 | Huang et al. |
| 7,904,962 B1 | 3/2011 | Jajodia et al. |
| 7,949,677 B2 | 5/2011 | Croft et al. |
| 7,954,150 B2 | 5/2011 | Croft et al. |
| 8,250,213 B2 | 8/2012 | Glover et al. |
| 8,274,912 B2 | 9/2012 | Wray et al. |
| 8,321,862 B2 | 11/2012 | Swamy et al. |
| 8,514,868 B2 | 8/2013 | Hill |
| 8,516,478 B1 | 8/2013 | Edwards et al. |
| 8,612,744 B2 | 12/2013 | Shieh |
| 8,612,971 B1 | 12/2013 | Fitzgerald et al. |
| 8,813,169 B2 | 8/2014 | Shieh et al. |
| 8,918,785 B1 | 12/2014 | Brandwine et al. |
| 8,959,568 B2 | 2/2015 | Hudis et al. |
| 9,038,151 B1 | 5/2015 | Chua et al. |
| 9,098,578 B2 | 8/2015 | Heim et al. |
| 9,380,027 B1 | 6/2016 | Lian et al. |
| 9,438,634 B1 | 9/2016 | Ross et al. |
| 9,467,476 B1 | 10/2016 | Shieh et al. |
| 9,529,995 B2 | 12/2016 | Shieh |
| 9,560,081 B1 | 1/2017 | Woolward |
| 9,609,026 B2 | 3/2017 | Ross et al. |
| 10,009,383 B2 | 6/2018 | Woolward |
| 2001/0014150 A1 | 8/2001 | Beebe et al. |
| 2002/0093527 A1 | 7/2002 | Sherlock et al. |
| 2002/0124067 A1 | 9/2002 | Parupudi et al. |
| 2003/0172145 A1 | 9/2003 | Nguyen |
| 2003/0177389 A1 | 9/2003 | Albert et al. |
| 2003/0204632 A1 | 10/2003 | Willebeek-Lemair et al. |
| 2003/0204728 A1 | 10/2003 | Irwin |
| 2004/0093513 A1 | 5/2004 | Cantrell et al. |
| 2004/0095897 A1 | 5/2004 | Vafaei |
| 2004/0193943 A1 | 9/2004 | Angelino et al. |
| 2004/0250124 A1 | 12/2004 | Chesla et al. |
| 2005/0005169 A1 | 1/2005 | Kelekar |
| 2005/0008001 A1 | 1/2005 | Williams et al. |
| 2005/0010821 A1 | 1/2005 | Cooper et al. |
| 2005/0081058 A1 | 4/2005 | Chang et al. |
| 2005/0160286 A1 | 7/2005 | Currie et al. |
| 2005/0188217 A1 | 8/2005 | Ghanea-Hercock |
| 2005/0193222 A1 | 9/2005 | Greene |
| 2005/0229255 A1 | 10/2005 | Gula et al. |
| 2006/0177063 A1 | 8/2006 | Conway et al. |
| 2007/0079308 A1 | 4/2007 | Chiaramonte et al. |
| 2007/0171921 A1 | 7/2007 | Wookey et al. |
| 2007/0192863 A1 | 8/2007 | Kapoor et al. |
| 2007/0271612 A1 | 11/2007 | Fang et al. |
| 2007/0283441 A1 | 12/2007 | Cole et al. |
| 2008/0052774 A1 | 2/2008 | Chesla et al. |
| 2008/0077690 A1 | 3/2008 | Miyajima |
| 2008/0083011 A1 | 4/2008 | McAlister et al. |
| 2008/0155239 A1 | 6/2008 | Chowdhury et al. |
| 2008/0262990 A1 | 10/2008 | Kapoor et al. |
| 2008/0276295 A1 | 11/2008 | Nair |
| 2008/0276297 A1 | 11/2008 | Shay |
| 2008/0301770 A1 | 12/2008 | Kinder |
| 2009/0003278 A1 | 1/2009 | Abdel-Kader et al. |
| 2009/0249472 A1 | 10/2009 | Litvin et al. |
| 2010/0043068 A1 | 2/2010 | Varadhan et al. |
| 2010/0095367 A1 | 4/2010 | Narayanaswamy |
| 2010/0100616 A1 | 4/2010 | Bryson et al. |
| 2010/0100962 A1 | 4/2010 | Boren |
| 2010/0175134 A1 | 7/2010 | Ali-Ahmad et al. |
| 2010/0228962 A1 | 9/2010 | Simon et al. |
| 2010/0235880 A1 | 9/2010 | Chen et al. |
| 2010/0251329 A1 | 9/2010 | Wei |
| 2010/0281533 A1 | 11/2010 | Mao et al. |
| 2011/0003580 A1 | 1/2011 | Belrose et al. |
| 2011/0030037 A1 | 2/2011 | Olshansky et al. |
| 2011/0033271 A1 | 2/2011 | Hanel |
| 2011/0069710 A1 | 3/2011 | Naven et al. |
| 2011/0138384 A1 | 6/2011 | Bozek et al. |
| 2011/0185431 A1 | 7/2011 | Deraison |
| 2011/0214157 A1 | 9/2011 | Korsunsky et al. |
| 2011/0225624 A1 | 9/2011 | Sawhney et al. |
| 2011/0261722 A1 | 10/2011 | Awano |
| 2011/0263238 A1 | 10/2011 | Riley et al. |
| 2011/0277034 A1 | 11/2011 | Hanson |
| 2011/0299533 A1 | 12/2011 | Yu et al. |
| 2011/0314520 A1 | 12/2011 | Olszewski et al. |
| 2012/0017258 A1 | 1/2012 | Suzuki |
| 2012/0131685 A1 | 5/2012 | Broch et al. |
| 2012/0167161 A1 | 6/2012 | Kim |
| 2012/0203877 A1 | 8/2012 | Bartholomay et al. |
| 2012/0210417 A1 | 8/2012 | Shieh |
| 2012/0240185 A1 | 9/2012 | Kapoor et al. |
| 2012/0254980 A1 | 10/2012 | Takahashi |
| 2012/0287931 A1 | 11/2012 | Kidambi et al. |
| 2012/0297073 A1 | 11/2012 | Glover et al. |
| 2012/0311144 A1 | 12/2012 | Akelbein et al. |
| 2012/0311575 A1 | 12/2012 | Song |
| 2013/0007234 A1 | 1/2013 | Bartfai-Walcott et al. |
| 2013/0019277 A1 | 1/2013 | Chang et al. |
| 2013/0055246 A1 | 2/2013 | Li et al. |
| 2013/0055398 A1 | 2/2013 | Li et al. |
| 2013/0091577 A1 | 4/2013 | McGinley et al. |
| 2013/0097692 A1 | 4/2013 | Cooper et al. |
| 2013/0108050 A1 | 5/2013 | Wu et al. |
| 2013/0117836 A1 | 5/2013 | Shieh |
| 2013/0125112 A1* | 5/2013 | Mittal .................. G06F 9/45558 718/1 |
| 2013/0174246 A1 | 7/2013 | Schrecker et al. |
| 2013/0254871 A1 | 9/2013 | Sun et al. |
| 2013/0275592 A1 | 10/2013 | Xu et al. |
| 2013/0283370 A1 | 10/2013 | Vipat et al. |
| 2013/0298184 A1* | 11/2013 | Ermagan .................. G06F 21/54 726/1 |
| 2013/0305357 A1 | 11/2013 | Ayyagari et al. |
| 2013/0340039 A1 | 12/2013 | Malaney |
| 2014/0013434 A1 | 1/2014 | Ranum et al. |
| 2014/0033271 A1 | 1/2014 | Barton et al. |
| 2014/0115654 A1 | 4/2014 | Rogers et al. |
| 2014/0137184 A1 | 5/2014 | Russello et al. |
| 2014/0149569 A1 | 5/2014 | Wittenstein et al. |
| 2014/0230008 A1 | 8/2014 | Feroz et al. |
| 2015/0089623 A1 | 3/2015 | Sondhi et al. |
| 2015/0150072 A1 | 5/2015 | Doctor et al. |
| 2015/0264011 A1 | 9/2015 | Liang |
| 2015/0281274 A1 | 10/2015 | Masurekar et al. |
| 2015/0281347 A1 | 10/2015 | Wang et al. |
| 2015/0304354 A1 | 10/2015 | Rogers et al. |
| 2015/0326589 A1 | 11/2015 | Smith |
| 2016/0099962 A1 | 4/2016 | Peach et al. |
| 2016/0269425 A1 | 9/2016 | Shieh et al. |
| 2017/0063791 A1 | 3/2017 | Ross et al. |
| 2017/0063933 A1 | 3/2017 | Shieh et al. |
| 2017/0163688 A1 | 6/2017 | Ross et al. |

OTHER PUBLICATIONS

Patent Cooperation Treaty Application No. PCT/US2016/048711, "International Search Report" and "Written Opinion of the International Searching Authority," dated Nov. 4, 2016, 10 pages.

Final Office Action, dated Jan. 26, 2017, U.S. Appl. No. 14/657,282, filed Mar. 13, 2015.

(56) References Cited

OTHER PUBLICATIONS

Non-Final Office Action, dated Mar. 17, 2017, U.S. Appl. No. 15/387,584, filed Dec. 21, 2016.
Shieh et al., "Context Aware Microsegmentation," U.S. Appl. No. 14/839,649, filed Aug. 28, 2015, pp. 1-48.
Ross et al., "Microsegmented Networks that Implement Vulnerability Scanning," U.S. Appl. No. 14/839,699, filed Aug. 28, 2015, pp. 1-47.
International Search Report dated May 5, 2016 in Patent Cooperation Treaty Application No. PCT/US2016/019882 filed Feb. 26, 2016, pp. 1-12.
Non-Final Office Action, dated Jan. 22, 2013, U.S. Appl. No. 13/288,872, filed Nov. 3, 2011.
Non-Final Office Action, dated Feb. 13, 2013, U.S. Appl. No. 13/363,088, filed Jan. 31, 2012.
Non-Final Office Action, dated May 8, 2013, U.S. Appl. No. 13/291,739, filed Nov. 8, 2011.
Final Office Action, dated Jun. 24, 2013, U.S. Appl. No. 13/288,872, filed Nov. 3, 2011.
Notice of Allowance, dated Aug. 16, 2013, U.S. Appl. No. 13/363,088, filed Jan. 31, 2012.
Final Office Action, dated Oct. 16, 2013, U.S. Appl. No. 13/291,739, filed Nov. 8, 2011.
Non-Final Office Action, dated Oct. 28, 2013, U.S. Appl. No. 13/288,872, filed Nov. 3, 2011.
Notice of Allowance, dated Apr. 11, 2014, U.S. Appl. No. 13/288,872, filed Nov. 3, 2011.
Non-Final Office Action, dated Jun. 23, 2014, U.S. Appl. No. 13/849,315, filed Mar. 22, 2013.
Non-Final Office Action, dated Oct. 21, 2014, U.S. Appl. No. 13/291,739, filed Nov. 8, 2011.
Final Office Action, dated Dec. 30, 2014, U.S. Appl. No. 13/849,315, filed Mar. 22, 2013.
Final Office Action, dated May 19, 2015, U.S. Appl. No. 13/291,739, filed Nov. 8, 2011.
Non-Final Office Action, dated Jun. 4, 2015, U.S. Appl. No. 13/849,315, filed Mar. 22, 2013.
Non-Final Office Action, dated Oct. 27, 2015, U.S. Appl. No. 13/291,739, filed Nov. 8, 2011.
Final Office Action, dated Dec. 2, 2015, U.S. Appl. No. 13/849,315, filed Mar. 22, 2013.
Non-Final Office Action, dated Aug. 30, 2016, U.S. Appl. No. 14/657,282, filed Mar. 13, 2015.
Notice of Allowance, dated Sep. 15, 2016, U.S. Appl. No. 15/192,967, filed Jun. 24, 2016.
Notice of Allowance, dated May 20, 2016, U.S. Appl. No. 13/291,739, filed Nov. 8, 2011.
Notice of Allowance, dated Apr. 18, 2016, U.S. Appl. No. 13/849,315, filed Mar. 22, 2013.
Non-Final Office Action, dated Jun. 6, 2017, U.S. Appl. No. 14/657,282, filed Mar. 13, 2015.
Notice of Allowance, dated Jun. 22, 2017, U.S. Appl. No. 15/387,584, filed Dec. 21, 2016.
Non-Final Office Action, dated Jun. 27, 2017, U.S. Appl. No. 15/441,156, filed Feb. 23, 2017.
Non-Final Office Action, dated Jul. 7, 2017, U.S. Appl. No. 15/382,443, filed Dec. 16, 2016.

* cited by examiner

CONTEXT AWARE MICROSEGMENTATION

CROSS-REFERENCE TO RELATED APPLICATIONS

This application is a continuation of U.S. patent application Ser. No. 14/839,649, filed Aug. 28, 2015, now U.S. Pat. No. 9,467,476, issued Oct. 11, 2016, 2016, which in turn is related to U.S. patent application Ser. No. 14/657,282, filed Mar. 13, 2015, U.S. patent application Ser. No. 14/673,679, filed Mar. 30, 2015, and U.S. patent application Ser. No. 14/839,699, filed Aug. 28, 2015, which are all hereby incorporated by reference herein in their entirety, including all references and appendices cited therein.

FIELD OF THE PRESENT TECHNOLOGY

The present technology is directed to cloud computing security, and more specifically, but not by limitation, to systems and methods for providing a microsegmented network that applies and enforces context aware security policies.

SUMMARY

According to some embodiments, the present technology is directed to a context aware microsegmented network, including: (a) an enforcement point creating a logical security boundary around at least a first and a second virtual machine collectively providing one or more microservices, the enforcement point configured to: (i) select at least a first and a second contextual security policy based upon attributes of the first and the second virtual machines respectively; (ii) apply at least one of the first and the second contextual security policies to control network traffic of the first and the second virtual machines within the logical security boundary based on the attributes of the first and the second virtual machines; and (b) a central enforcement controller that: (1) determines a packet forwarding path for the enforcement point; (2) selects a third contextual security policy based on at least one of a location of the enforcement point and security attributes of the enforcement point; and (3) applies the third contextual security policy to network traffic into and out of the logical security boundary received by at least one of the location of the enforcement point or the packet forwarding path.

According to some embodiments, the present technology is directed to a method for context aware security policy enforcement, including: (a) selecting, by an enforcement point, at least a first and a second contextual security policy based upon attributes of at least a first and a second virtual machine respectively; (b) applying, by the enforcement point, at least one of the first and the second contextual security policies to control network traffic of the first and the second virtual machines within a logical security boundary based on the attributes of the first and the second virtual machines; (c) determining, by a central enforcement controller, a packet forwarding path for the enforcement point; (d) selecting, by the central enforcement controller, a third contextual security policy based on at least one of a location of the enforcement point and security attributes of the enforcement point; and (e) applying, by the central enforcement controller, the third contextual security policy to network traffic into and out of the logical security boundary received by at least one of the location of the enforcement point or the packet forwarding path.

According to some embodiments, the present technology is directed to a non-transitory computer-readable storage medium having embodied thereon a program, the program being executable by a processor to perform a method. The method may comprise: (a) selecting, by an enforcement point, at least a first and a second contextual security policy based upon attributes of at least a first and a second virtual machine respectively; (b) applying, by the enforcement point, at least one of the first and the second contextual security policies to control network traffic of the first and the second virtual machines within a logical security boundary based on the attributes of the first and the second virtual machines; (c) determining, by a central enforcement controller, a packet forwarding path for the enforcement point; (d) selecting, by the central enforcement controller, a third contextual security policy based on at least one of a location of the enforcement point and security attributes of the enforcement point; and (e) applying, by the central enforcement controller, the third contextual security policy to network traffic into and out of the logical security boundary received by at least one of the location of the enforcement point or the packet forwarding path.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
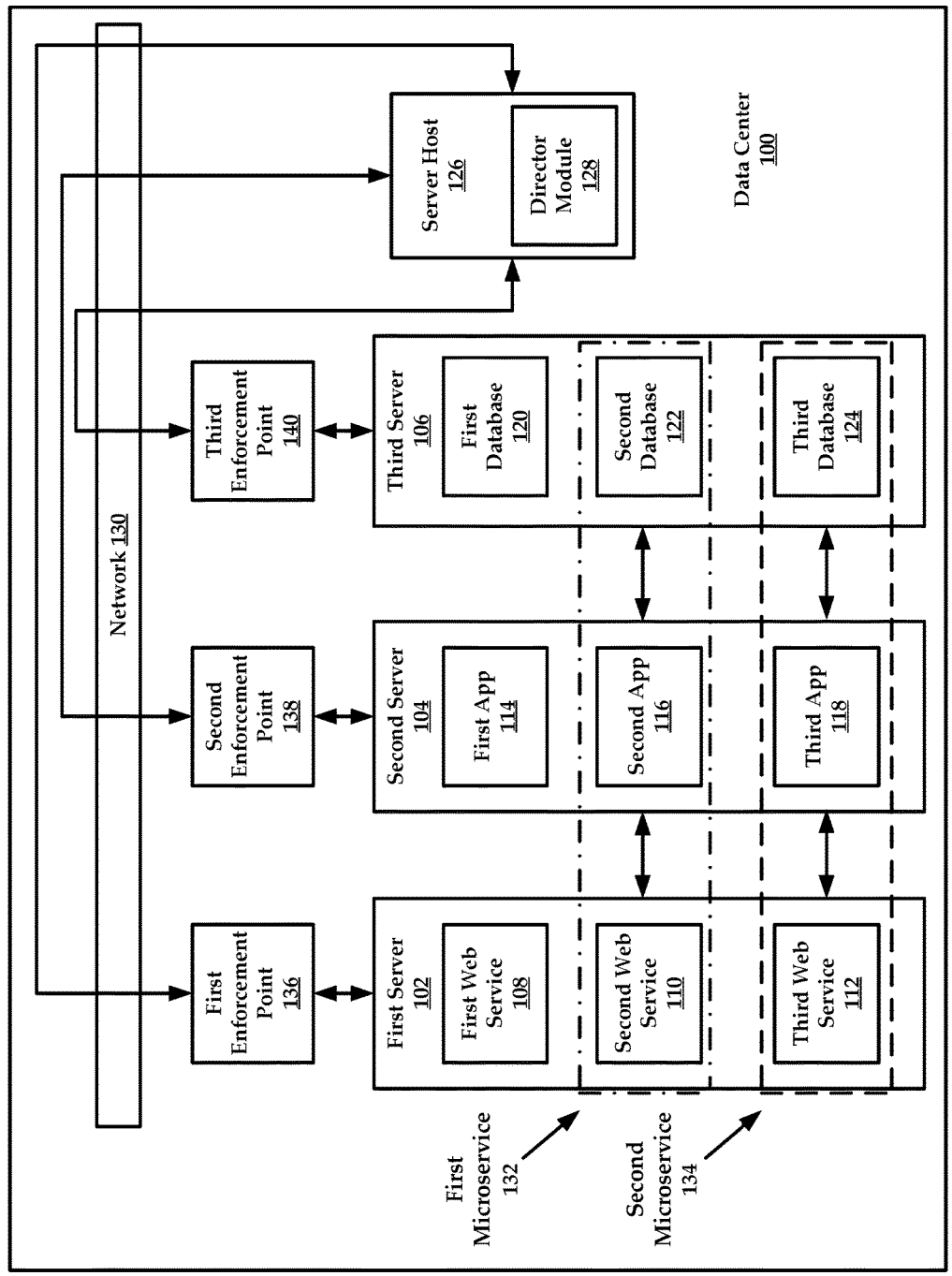
FIG. 1 is a schematic diagram of a datacenter providing secure microservices that are secured using the present technology.

The present technology is directed to providing security within distributed microservices. The present technology creates secure virtual boundaries around microservices. In some embodiments, the present technology provides context aware networks that provide context-based security through enforcement points that control logical security boundaries. The logical security boundaries encompass microservices provided by physical or virtual machines, and the logical security boundaries can extend across microservices that are distributed in data centers in various locations. Thus, the virtual machines need not be collocated.

In one embodiment, the present technology involves a datacenter, which can be implemented within a cloud. The datacenter includes physical resources such as servers that provide virtual machines. The virtual machines can provide microservice components such as web services, application services, database services, and so forth. In some embodiments, the servers are physically separate from one another within the datacenter.

A microservice is a combination of microservice components selected to facilitate the microservice. An example microservice includes, but is not limited to, a game, an e-commerce application, a media service, and so forth. Because the servers providing the microservice components can be distributed in different physical locations, the microservice is itself distributed because its microservice components may not reside on the same physical server. To be sure, the present technology can manage enforcement points on multiple servers as a single, logical system. Enforcement points are described in related U.S. patent application Ser. No. 14/673,679, filed Mar. 30, 2015, which is hereby incorporated by reference in its entirety.

In the present technology, the servers and virtual machines are controlled with a host server that coordinates the operations of the distributed microservice components to provide the microservice. The host server includes a director module that manages sessions and settings of the distributed microservice components.

The director module can also instantiate (e.g., "spin up") a plurality of enforcement points that are configured to create a secure virtual boundary around a set of distributed microservice components for a microservice.

The enforcement points can intercept and measure traffic at locations within the secure virtual boundary, such as traffic entering and exiting the distributed microservice components.

In some embodiments, the director module distributes a security policy, such as a firewall policy to the enforcement points which protect each of the distributed microservice components. The director module can also receive traffic information from the enforcement points and determine network traffic profiles and malicious attacks that are occurring on, or within the secure virtual boundary.

Advantageously, the present technology provides a distributed microservice system where distributed enforcement points are placed in communication with enterprise assets such as microservice components. The enforcement points are configured to correlate information to understand the traffic flows within the secure virtual boundary.

The enforcement points provide a stateful solution by operating as security policy enforcement devices that use stateful inspection engines for analyzing network traffic.

In another advantage, the present technology provides for real-time detection and visualization of threat movement, attack remediation, and exfiltration prevention, as well as microsegmentation and policy enforcement control.

As mentioned above, the present technology provides a data center security solution that protects enterprise data, whether on-cloud or on-premise, with a single logical security system.

The data center security of the present technology delivers a consistent layer of visibility and control across virtual, cloud and physical applications. Using the present technology, enterprises can understand the progression of an attack and trace its lineage to a "Patient Zero," a point of entry of an attacker (or the first infected computer). Using the present technology, enterprises have immediate insight into their data center risk profile and are able to adjust security measures without changing existing policies or Information Technology (IT) infrastructures.

Referring now to FIG. 1, a schematic diagram of a data center 100 providing secure microservices that are secured using the present technology is illustrated. In some embodiments, the data center 100 is generally described as a cloud-based computing environment that facilitates services, such as enterprise services. It will be understood that the data center 100 can be utilized to provide any type of service, such as gaming services, email services, e-commerce services, Domain Name System (DNS) services, web hosting services, and so forth.

In general, a cloud-based computing environment is a resource that typically combines the computational power of a large grouping of processors, and/or an environment that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, such as web servers, with each web server (or at least a plurality thereof) providing processor and/or storage resources. These servers may manage workloads servicing multiple users (e.g., cloud resource customers or other users). Typically, each user places workload demands upon the cloud that vary in real-time, sometimes dramatically. The nature and extent of these variations typically depend on the type of business associated with the user.

The data center 100 is configured to provide microservices to tenants. A microservice will be understood to include a software application (e.g., service) that is comprised of a plurality of independently deployable services, referred to herein as "microservice components." In some embodiments, the data center 100 comprises a plurality of physical servers (sometimes referred to as racks or blades), such as a first server 102, a second server 104, and a third server 106.

In one embodiment, the first server 102 provides web service microservices that provide a standardized means for integrating web applications using various open standards such as JavaScript Object Notation (JSON), Representational State Transfer (REST), and so forth. As illustrated, the first server 102 comprises a plurality of web service microservice components such as a first web service 108, a second web service 110, and a third web service 112. Again, the first server 102 can comprise additional or fewer web service microservice components than those illustrated. Also, the type of web service provided by each of the microservice components can be identical or different. For example, the web service microservice components 108-112 can all provide Simple Object Access Protocol (SOAP) services, while in another embodiment each of the web service microservice components 108-112 can provide a unique web service.

The second server 104 comprises a plurality of application microservice components such as the first application (App) 114, the second application 116, and the third application 118. Again, the second server 104 can comprise additional or fewer application microservice components than those illustrated. Also, the type of application provided by each of the microservice components can be identical or different. The applications provided by the application microservice components 114-118 can be identical or different from one another.

The third server 106 comprises a plurality of database microservice components such as the first database 120, the second database 122, and the third database 124. Again, the third server 106 can comprise additional or fewer database microservice components than those illustrated. Also, the type of database provided by each of the microservice components can be identical or different. The databases provided by the database microservice components 120-124 can be identical or different from one another.

The data center 100 also comprises a server host 126 that can be located away from the servers 102-106 so as to reduce the likelihood that the host server will be infected with malware or subject to a malicious attack if any of the servers 102-106 or their microservice components are attacked. The server host 126 can be a physical server. The server host 126 can comprise a director module 128. The director module 128 can comprise executable instructions that are stored in a non-transitory computer readable medium, such as memory of the server host 126. The director module 128 can be executed by a processor of the server host 126 to provide functionalities ascribed to the director module 128 which are described in greater detail below.

As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality.

The servers 102-106 each provide a microservice type. For example, the microservice type for the first server 102 comprises web services, while a microservice type of the second server 104 is applications, and the microservice type of the third server 106 is database-related.

In some embodiments, the data center 100 can comprise additional or fewer servers than those illustrated. Also, the microservices of some of the servers, for example servers 102 and 104, can be combined onto a single physical server but facilitated by a virtual machine. Thus, the web service microservice components 108-112 can be executed using a first virtual machine, while the application microservice components 114-118 can be executed on a second virtual machine. Indeed, the first and second virtual machines can be managed on the same physical server, such as the first or second servers 102 and 104, respectively.

In some embodiments the data center 100 comprises a network 130 that communicatively couples the servers 102-106 and server host 126. Suitable networks may include or interface with any one or more of, for instance, a local intranet, a Personal Area Network (PAN), a Local Area Network (LAN), a Wide Area Network (WAN), a Metropolitan Area Network (MAN), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, Digital Subscriber Line (DSL) connection, an Ethernet connection, an Integrated Services Digital Network (ISDN) line, a dial-up port such as a V.90, V.34 or V.34bis analog modem connection, a cable modem, an Asynchronous Transfer Mode (ATM) connection, or a Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), Cellular Digital Packet Data (CDPD), Research in Motion, Limited (RIM) duplex paging network, Bluetooth radio, or an IEEE 802.11-based radio frequency network.

The network 130 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In some embodiments, individual microservice components from an individual server can be used to facilitate a microservice. For example, a first microservice 132 comprises a game service. The first microservice 132 comprises the second web service 110, the second application 116, and the second database 122. To be sure, these selected microservice components are needed to facilitate the game service.

In various exemplary embodiments, a second microservice 134 comprises an e-commerce service. The second microservice 134 comprises the third web service 112, the third application 118, and the third database 124. To be sure, these selected microservice components are needed to facilitate the e-commerce service.

In sum, the data center 100 is configured to provide a plurality of microservices where each microservice is comprised of a plurality of microservice components.

Cooperative communication between microservice components allows the data center 100 to provide the microservice to a tenant or end user. For example, the second web service 110, the second application 116, and the second database 122 are all communicatively coupled with one another using the network 130.

As mentioned above, the servers that host these microservice components can be positioned remotely from one another. Thus, the microservice components need not be collocated in the same physical server. This physical separation of servers results in physical separation of microservice components for a microservice.

The present technology can provide security policies such as firewall policies that protect these distributed microservices. Rather than directing network traffic to a static firewall or other static appliance, the data center 100 can employ the use of enforcement points, such as enforcement points 136-140 that are disposed within the network communications path of the microservice components of a microservice.

In general, an enforcement point is a virtual or physical module that operates as a security policy enforcement device that uses stateful inspection engines for analyzing network traffic within a secure virtual (e.g., logical) boundary.

An enforcement point can be "spun up" or initiated when a microservice is requested by a tenant or user of the data center 100. For example, if an end user desires to use the first microservice 132 (e.g., a game microservice), the user will request use of the first microservice 132 through the server host 126. The server host 126 will determine which microservice components are needed (in this case the second web service 110, the second application 116, and the second database 122) and will deploy a plurality of enforcement points for the microservice components.

In one embodiment, the data center 100 includes a first enforcement point 136, a second enforcement point 138, and a third enforcement point 140. The first enforcement point 136 is deployed for the first server 102 and the second web service 110. The second enforcement point 138 is deployed for the second server 104 and the second application 116, while the third enforcement point 140 is deployed for the third server 106 and the second database 122. Again, the deployment of the enforcement points is controlled by the director module 128 of the server host 126.

Each of the enforcement points can be placed in network communication with their respective microservice component to intercept and analyze network traffic. In some embodiments, each of the enforcement points analyzes microservice component network traffic by decoding higher-level protocols that create the data stream in software, at "line rate," with an acceptable computational cost.

The enforcement points can be deployed near an asset (such as a server or microservice component) to examine precisely the internal and external traffic into that asset (which may be indicative of malicious attacks) or from that asset (indications of infection and internal attacks), and can also be used to provide very granular control (e.g., pass only specific traffic). In some embodiments, the enforcement points comprise logical entities and operate in a global context, the enforcement points can migrate when an asset, such as a microservice component, migrates (e.g., in a virtual environment).

Figure 2:
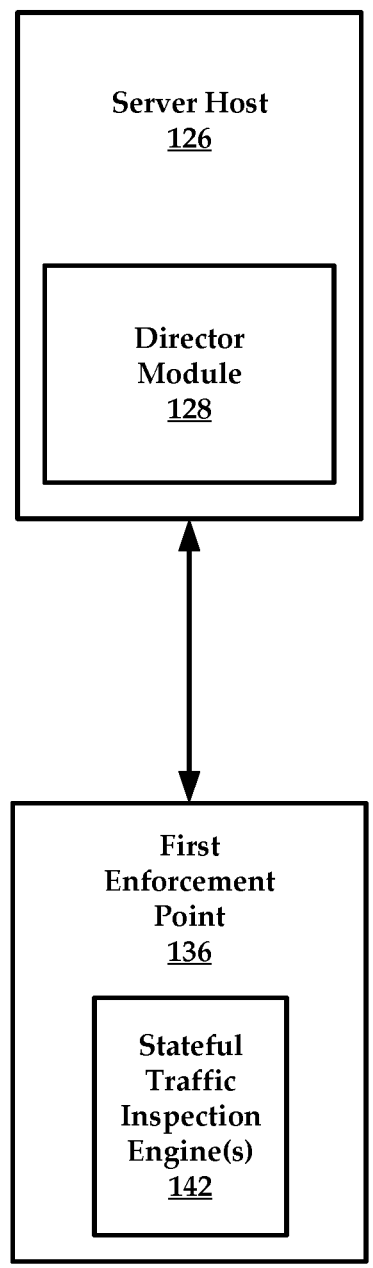
FIG. 2 is a schematic diagram of an example enforcement point and server host for use in the datacenter.

Referring now to FIG. 2, an example enforcement point is illustrated. The enforcement point includes the first enforcement point 136. The first enforcement point 136 comprises a stateful traffic inspection engine(s) 142 that can be used for traffic inspection and/or network traffic control based on security policies received from the director module 128.

Figure 3:
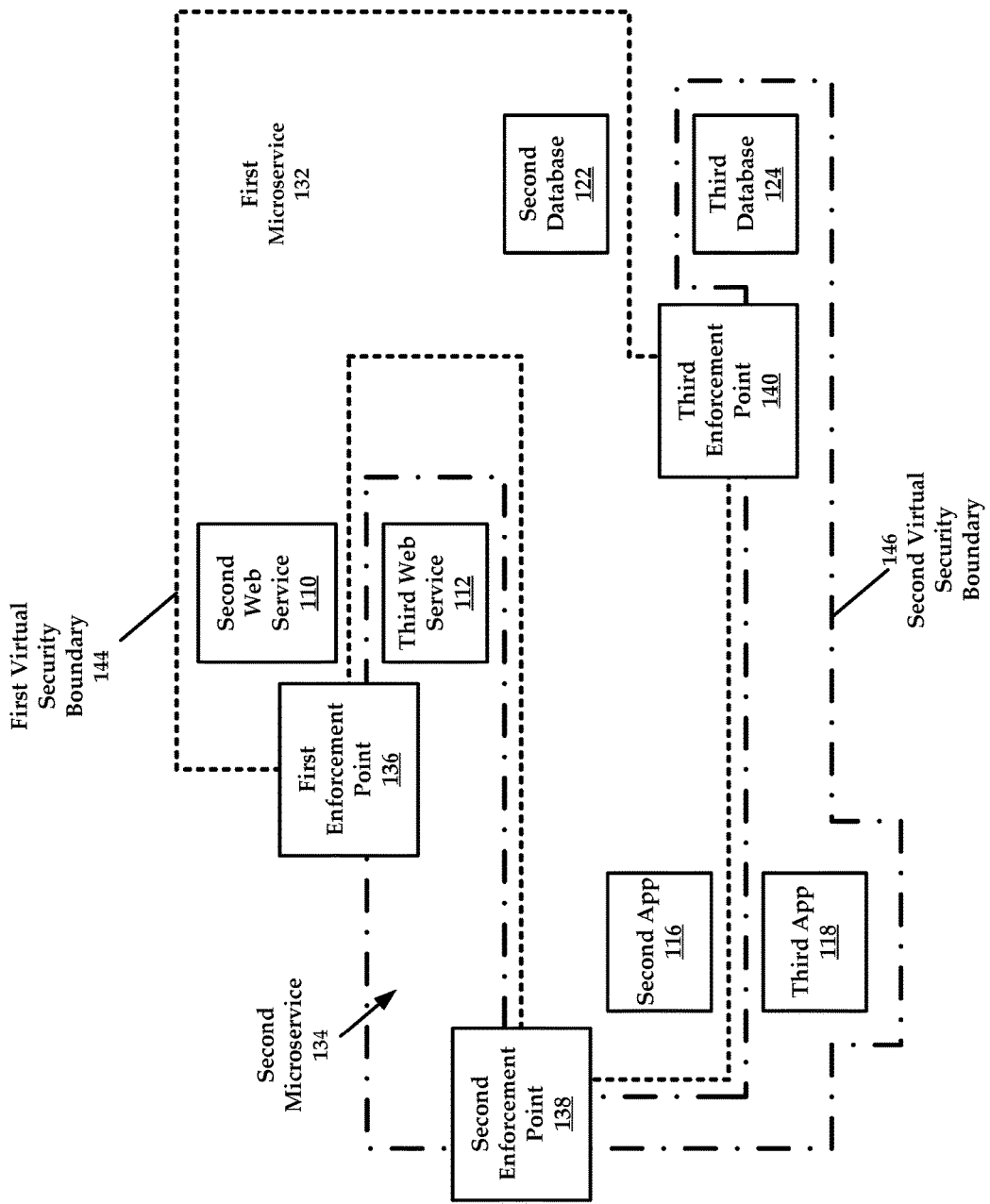
FIG. 3 is a schematic diagram that illustrates the deployment of enforcement points to create logical secure boundaries around distributed microservice components.

Referring now to FIG. 3, which illustrates the distributed nature of the microservice components of FIG. 1. Again, the microservice components required for a particular microservice may be distributed amongst many servers located proximately from one another.

The enforcement points 136-140 can create a logical or virtual security boundary around the microservice components for a microservice. In one example, the enforcement points 136-140 can create a first virtual security boundary 144 around the first microservice 132 (e.g., a game microservice), and specifically the microservice components of the first microservice 132 (the second web service 110, the second application 116, and the second database 122). In another example, the enforcement points 136-140 can create a second virtual security boundary 146 around the second microservice 134 (e.g., an e-commerce service), and specifically the microservice components of the second microservice 134 (the third web service 112, the third application 118, and the third database 124).

While FIG. 1 conceptually illustrates the microservice components for a particular microservice as being aligned, FIG. 3 illustrates a distributed data center where the microservice components for a particular microservice are not strictly aligned. This again is due to the microservice components residing on servers that are distributed throughout the data center 100. Thus, the virtual security boundary created by the enforcement points 136-140 can traverse a meandering path that encloses each of the microservices.

As mentioned above, a set of enforcement points such as enforcement points 136-140, can be used to create a plurality of virtual security boundaries. In other embodiments, a set of enforcement points can be deployed for each microservice. The use of virtual security boundaries also allows for microservices to be logically separated from one another for security purposes.

In FIG. 3, the first enforcement point 136 is positioned in association with microservice components the second web service 110 and the third web service 112. The first enforcement point 136 is positioned into the security boundaries of both the first virtual security boundary 144 and the second virtual security boundary 146. Likewise, the second and third enforcement points 138 and 140 are each positioned into the security boundaries of both the first virtual security boundary 144 and the second virtual security boundary 146.

According to some embodiments, the director module 128 is configured to manage sessions and settings of the distributed microservice components. For example, the director module 128 specifies what microservice components are required for a microservice, when each of the microservice components should be initiated and/or deactivated, and so forth. The director module 128 also determines if additional microservice components should be initiated during microservice use. For example, in a gaming microservice, the director module 128 may increase processing capacity for an application microservice component by initiating one or more additional application microservice component(s). The director module 128 can deploy additional enforcement points if needed to enlarge the virtual security boundary. This type of dynamic virtual security boundary management ensures that the one or more additional application microservice component(s) are protected through inclusion into the virtual security boundary of the gaming microservice. A similar but inverse process can be performed by the director module 128 when microservice components are deactivated.

Also, the director module 128 can track migration of the microservice components and re-deploy the enforcement points. For example, if the first server 102 is taken offline or is no longer functioning, the data center 100 may have backup servers that provide the same microservice as the first server 102. When this backup server comes online, the web service microservice is migrated over to the backup server and the virtual boundary is reconfigured, or the enforcement point is re-deployed. This re-deployment of the enforcement point or reconfiguration of security policy of the enforcement point causes a reconfiguration of the virtual security boundary.

In some embodiments, the director module 128 is configured to implement and distribute security policies for microservices. The security policy may be in accordance with a security profile for a microservice. The security profile can define what types of network traffic anomalies indicate possible malware issues. These traffic anomalies can involve comparisons of network traffic volume over a period of time, network traffic volume at a given period of time, network traffic volume compared to application usage, network traffic input volume versus network traffic output volume, and other similar traffic anomalies.

The director module 128 can selectively control and isolate the network traffic entering and/or exiting any of the microservice components of a microservice, due to the presence of enforcement points with each microservice component. For example, if the network traffic is determined to be anomalous at the second web service 110, the director module 128 can cause the first enforcement point 136 to throttle network traffic into or out of the second web service 110.

Advantageously, the director module 128 can isolate or quarantine a microservice component that appears to be (or actually is) infected with malware or is being subjected to malware attack by providing commands to the enforcement point associated with the microservice component.

Figure 4:
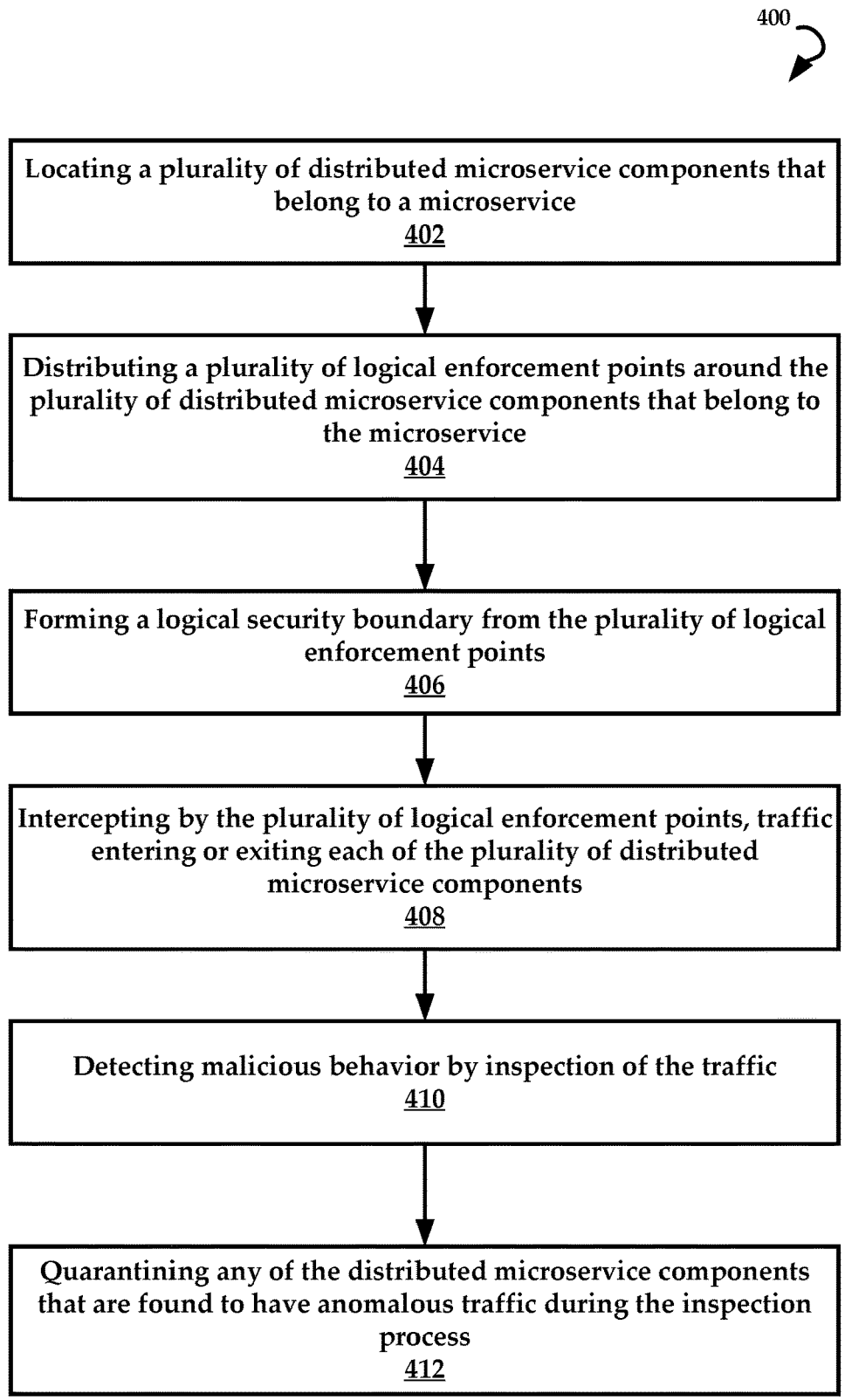
FIG. 4 is a flowchart of an example method for creating logical secure boundaries around distributed microservice components.

Referring now to FIG. 4, a method 400 for providing a logical security boundary for microservices is illustrated. In some embodiments, the method 400 comprises locating 402 a plurality of distributed microservice components that belong to a microservice. In one embodiment, at least a portion of the plurality of distributed microservice components are located on different physical servers in a cloud. In other embodiments, the plurality of distributed microservice components are collocated on the same server. For example, the director module can be used to determine the location of each distributed microservice component that is used to facilitate a microservice, such as an e-commerce application (e.g., second microservice 134).

Next, the method 400 further includes distributing 404 a plurality of logical enforcement points around the plurality of distributed microservice components that belong to the microservice. For example, the director module can spin up one or more virtual enforcement points (e.g., virtual security appliances) for each distributed microservice component. In some embodiments, virtual enforcement points are positioned both upstream and downstream of each distributed microservice component.

Next, the method 400 comprises forming 406 a logical security boundary from the plurality of logical enforcement points. That is, the virtual enforcement points are communicatively coupled to form a logical security boundary that includes the distributed microservice components.

In some embodiments, the method 400 comprises intercepting 408 by the plurality of logical enforcement points, traffic entering or exiting each of the plurality of distributed microservice components. The method 400 also includes detecting 410 malicious behavior by inspection of the traffic.

In some embodiments, the method 400 includes quarantining 412 any of the distributed microservice components that are found to have anomalous traffic during the inspection process.

Figure 5:
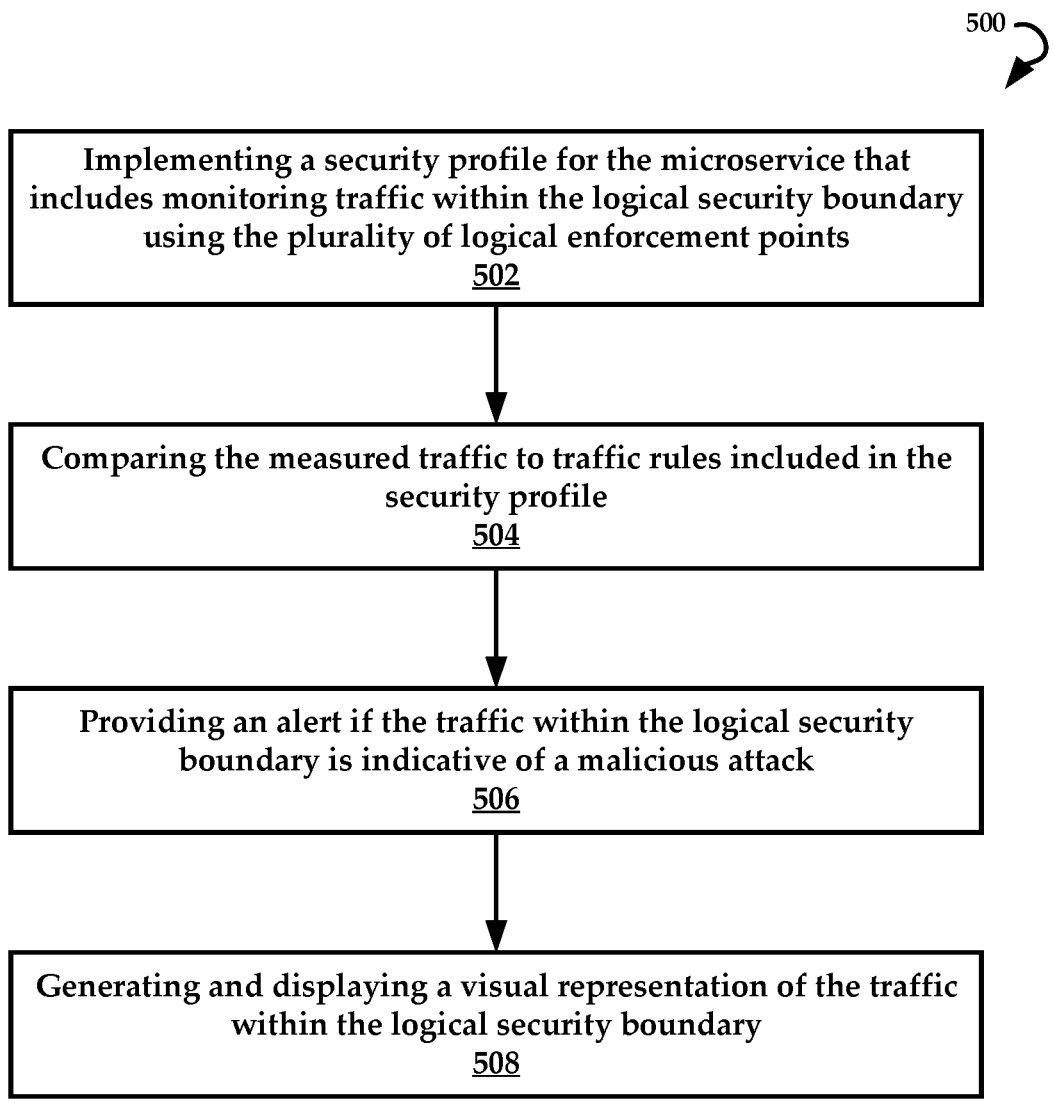
FIG. 5 is a flowchart that illustrates another example method for implementing a security policy in a distributed manner.

Referring now to FIG. 5, which illustrates another example method 500 for implementing a security policy in a distributed manner. To be sure, the method 500 of FIG. 5 can be implemented after deployment of enforcement points throughout a microservice to create a logical security boundary.

In some embodiments, the method 500 includes implementing 502 a security profile for the microservice that includes monitoring traffic within the logical security boundary using the plurality of logical enforcement points.

Next, the method 500 includes comparing 504 the measured traffic to traffic rules included in the security profile. This comparison process can occur at the enforcement point or at the director module.

Next, the method 500 also comprises providing 506 an alert if the traffic within the logical security boundary is indicative of a malicious attack. In some embodiments, the director module can output a message to a system administrator, such as an email or short message service (SMS) message that indicates that a violation of the security profile has occurred.

In some embodiments, the method 500 comprises generating 508 and displaying a visual representation of the traffic within the logical security boundary.

Figure 6:
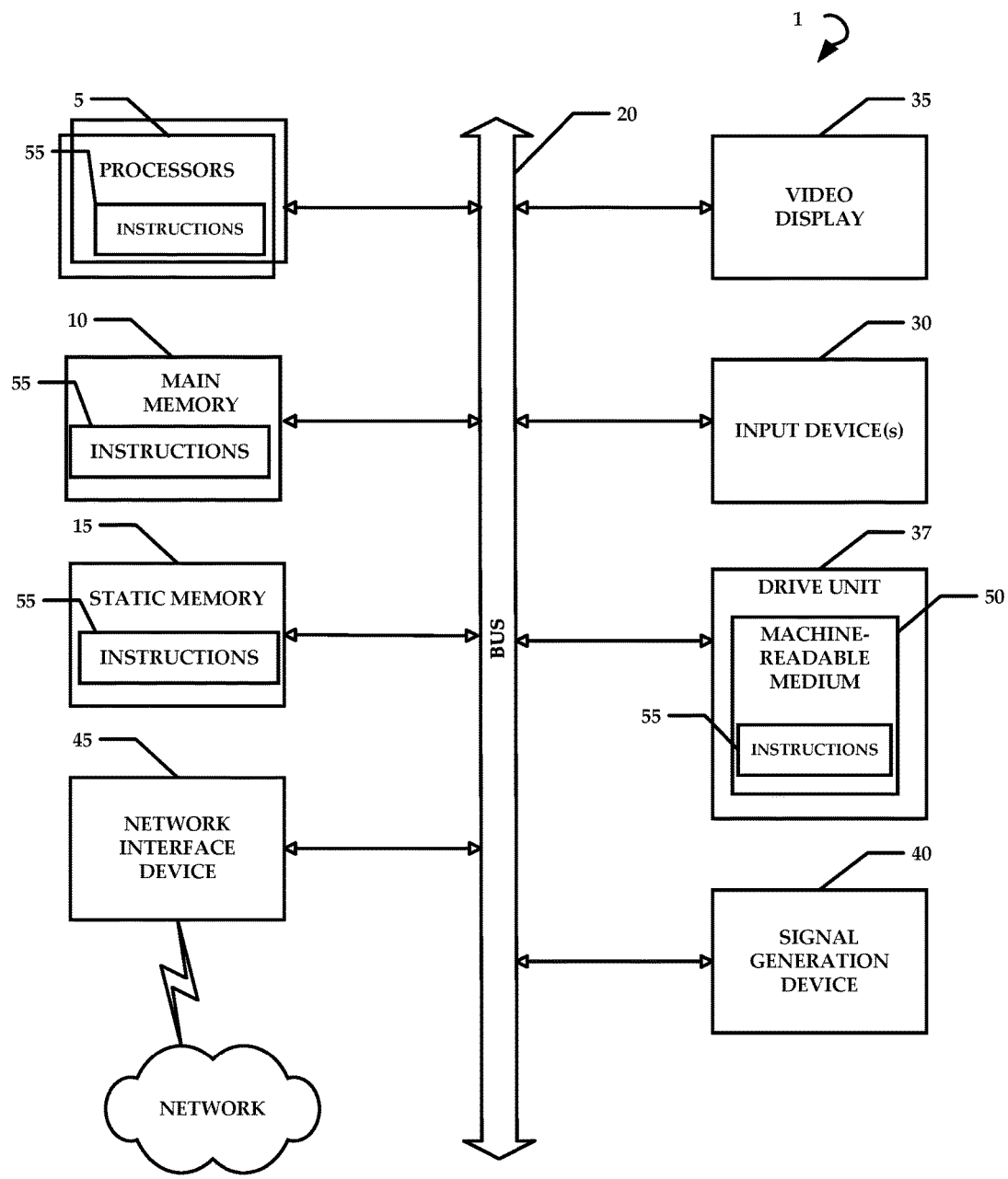
FIG. 6 is an example computing device that can be used to practice aspects of the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

According to some embodiments, the present technology can include context aware networks that provide security policies that are contextual. These contextual security policies can be applied advantageously when clients, networks, virtual machines, and/or microservices (e.g., workloads) require a plurality of different security policies.

As discussed above, microsegmentation is a technology that defines logical security boundary across physical, virtual, and agent-based workload deployments. The policy of defining the security boundary is used to enforce communication security between any two workloads, even the workloads are distributed to two virtual machines on the same hypervisor.

However, traditional microsegmentation policies focus on the protected workload, without considering the context of the workload deployment and communication.

The present technology extends a micro-security policy for these microservices to include context information in the security policy. Adding contextual information, such as (but not limited to) location of workloads, network connection attributes of incoming interfaces, Internet service providers, and so forth to the security policies enhance the security within a microsegmented data center.

As an example, the security policy of any given workload could be different from other workloads in the data center. The differences in the security policies can result from a different security mechanism used for enforcement (such as workload in private data center versus a public cloud). In another example, differences in the security policies can result from different governing laws (such as workloads in the United States vs. Canada vs. Europe) for the data center, the client, or both the client and data center.

Also, network connections to the data center may originate from a plurality of different network interfaces, which each can exist in different security zones with different security requirements. These differences require different security policies to enforce microsegmentation, in some embodiments. For example, one security zone could include a government agency while another security zone includes public network access points. In another example, a security zone could include a corporate data center.

Figure 7:
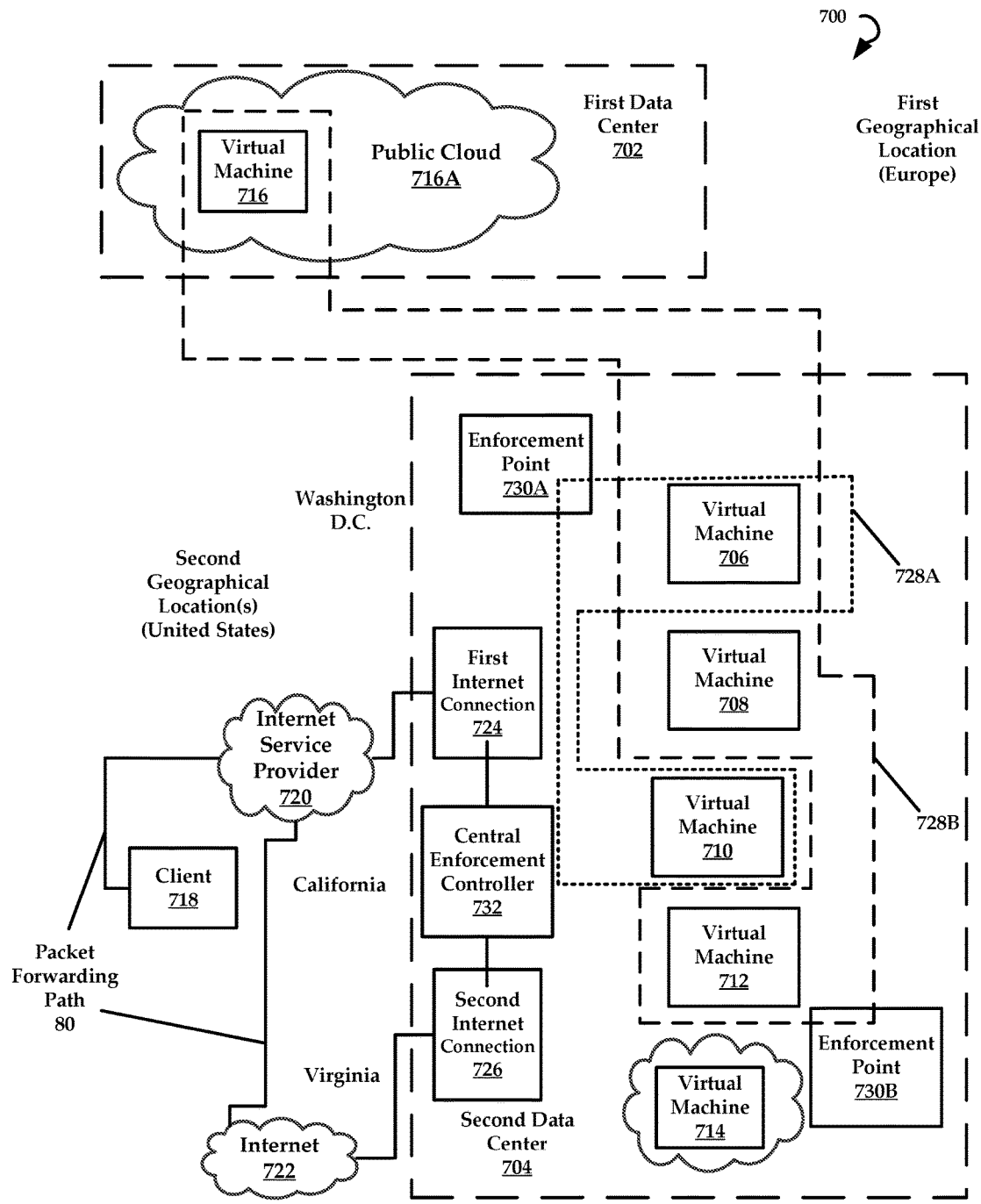
FIG. 7 is another example datacenter providing secure microservices that is configured to implement context aware secure policies for various virtual machines.

FIG. 7 illustrates a schematic diagram of an example network 700 that is context aware for applying security policies to virtual machines operating within one or more data centers.

The network 700 comprises a first data center 702 that is disposed at a first geographical location such as a data center in Europe. A second data center 704 is positioned in a second geographic location, such as the United States. More specifically, the second data center 704 can include virtual machines in many locations such virtual machines 706, 708, and 710 in Washington D.C., a virtual machine 712 in California, and a virtual machine 714 in Virginia.

The first data center 702 can include a virtual machine 716 operating in a public cloud 716A.

A client 718 can access the first data center 702 and/or the second data center 704 through an Internet Service Provider (ISP) 720. In some embodiments, the client 718 (or other computing systems) can attempt to access the first and/or second data centers 702/704 through a public network, such as an Internet 722. In one embodiment, the second data center 704 provides a first internet connection 724 that communicatively couples with the ISP 720 on a first packeting forwarding path. The second data center 704 provides a second internet connection 726 that communicatively couples with a public network (e.g., the Internet 722) on a second packet forwarding path or the same packet forwarding path as used by the ISP 720.

In another example, the second internet connection 726 is utilized to intercept network traffic from public networks such as the Internet 722. By virtue of the public nature of the Internet 722, a central enforcement controller 732 can apply a contextual security policy where client attributes are evaluated. For example, the central enforcement controller 732 can inspect the network packets to determine attributes of the client 718, which could include information gathered about the client device itself or information about an end user of the client 718 from web browser information or other similar contextual data.

Also, while the first internet connection 724 and the second internet connection 726 are illustrated in FIG. 7, it will be understood that the second data center 704 can comprise additional internet connections that provide communication packeting forwarding paths that allow third party access to the second data center 704.

In some embodiments, the central enforcement controller 732 can apply security policies for network connection based on a protocol or packet forwarding path used by the client 718. For example, if the client 718 attempts to contact the first internet connection 724 on packet forwarding path 80, and the client 718 resides in a country that is on a safe list, the central enforcement controller 732 allows all network traffic from the client 718. In another embodiment, any traffic transmitted on packet forwarding path 80 is allowable, while all other traffic on other packet forwarding paths is rejected by the connection. Thus, the context in this instance is packet forwarding path specific. A hierarchical context policy further requires the traffic to originate from a safe ISP or from a safe location, even if it was transmitted on packet forwarding path 80. In one example an unsafe or untrusted location could include a public cloud, such as the public cloud 716A of the first data center 702.

Rather than denying the traffic on packet forwarding path 80 from a location that is not on the safe location list, the central enforcement controller 732 can subject the network traffic to intrusion prevention (IP) scanning. If the traffic from the location passes the IP scanning, the client 718 can be permitted to communicate with the data center.

In one embodiment the virtual machines 706 and 710 are placed within a virtual boundary 728A that is controlled by enforcement point 730A. An enforcement point 730B controls the security policies for the virtual machines 706, 708, 712, and 716 within a virtual boundary 728B. The virtual boundaries and enforcement points are described in greater detail above. Also, it is noteworthy to mention that each of the virtual machines can provide a plurality of microservices. The virtual boundaries can extend between individual microservices offered by a plurality of virtual machines. A virtual boundary can be referred to as a logical security boundary.

As illustrated in FIG. 1 and FIG. 3, the microservices can be distributed throughout many different physical or virtual machines.

In some embodiments, the central enforcement controller 732 is provided to enforce contextual security policies at various internet connections of the second data center 704, such as the first internet connection 724 and the second internet connection 726. To be sure, each of these interfaces can be associated with a unique or contextual security policy. For example, the central enforcement controller 732 maintains a list of contextual security policies for various ISPs. These security policies are contextual because they can be based on security or safety attributes of the various ISPs. The client 718 can attempt to access microservices on the first data center 702 and/or the second data center 704 through the ISP 720. The central enforcement controller 732 can inspect attributes of the ISP 720 such as location, blacklists, whitelists, reputation databases, and so forth. These attributes are compared against a database of ISP specific contextual security policies, which are applied to ISP coupling connections of the data center.

If the context of the ISP 720 determines that the ISP 720 handles traffic originating from an area of known cyber security issues, the central enforcement controller 732 can refuse all traffic from the ISP 720. Conversely, if the ISP 720 has traffic originating from secure or safe locations, the central enforcement controller 732 can allow all traffic from the ISP 720. By way of example, the central enforcement controller 732 can function similarly to the first enforcement point 136 illustrated in FIG. 2 and described above, which utilizes a stateful traffic inspection engine(s) 142 to process network traffic, although it is important to note that the central enforcement controller 732 applies context-based security policies using, for example, attributes of network traffic rather than a context-less security policy. Also, as mentioned in the embodiments above in FIGS. 1-5, enforcement points can be configured to intercept network traffic within their respective logical security boundaries and/or within the virtual machines and/or microservices components thereof. The enforcement points 730A and 730B can likewise use components of the enforcement points of FIGS. 1 and 2, while incorporating the aspects of context aware security policy selection and context-based security policy application to microservices components or virtual machines within their logical security boundary.

In one embodiment, the enforcement point 730A can apply a contextual security policy for the virtual machines 706 and 710, which are all located in the United States, whereas the enforcement point 730B can apply a different contextual security policy for virtual machines 706, 708, 712, and 716. The contextual security policy applied by the enforcement point 730B requires a different security policy to be applied to the virtual machine 716 because it resides in Europe. As an example, European countries have different data privacy policies compared to the United States. Thus, the enforcement point 730B applies a contextual security policy for the virtual machine 716 that is based on European Union regulations on data privacy. The enforcement point 730B applies a contextual security policy, for the virtual machines 706, 708, and 712, which is based on United States privacy laws.

The contextual security policy can be set at various levels of granularity relative to location. For example, a contextual security policy can be established to allow all traffic on packet forwarding path 80 originating from California, whereas only network traffic transmitted on packet forwarding path 80 is allowed if the network traffic originates in Virginia.

In some embodiments, the virtual machine 714 can implement a database service for storing the contextual security policies used by the central enforcement controller 732, the enforcement point 730A, and the enforcement point 730B.

Figure 8:
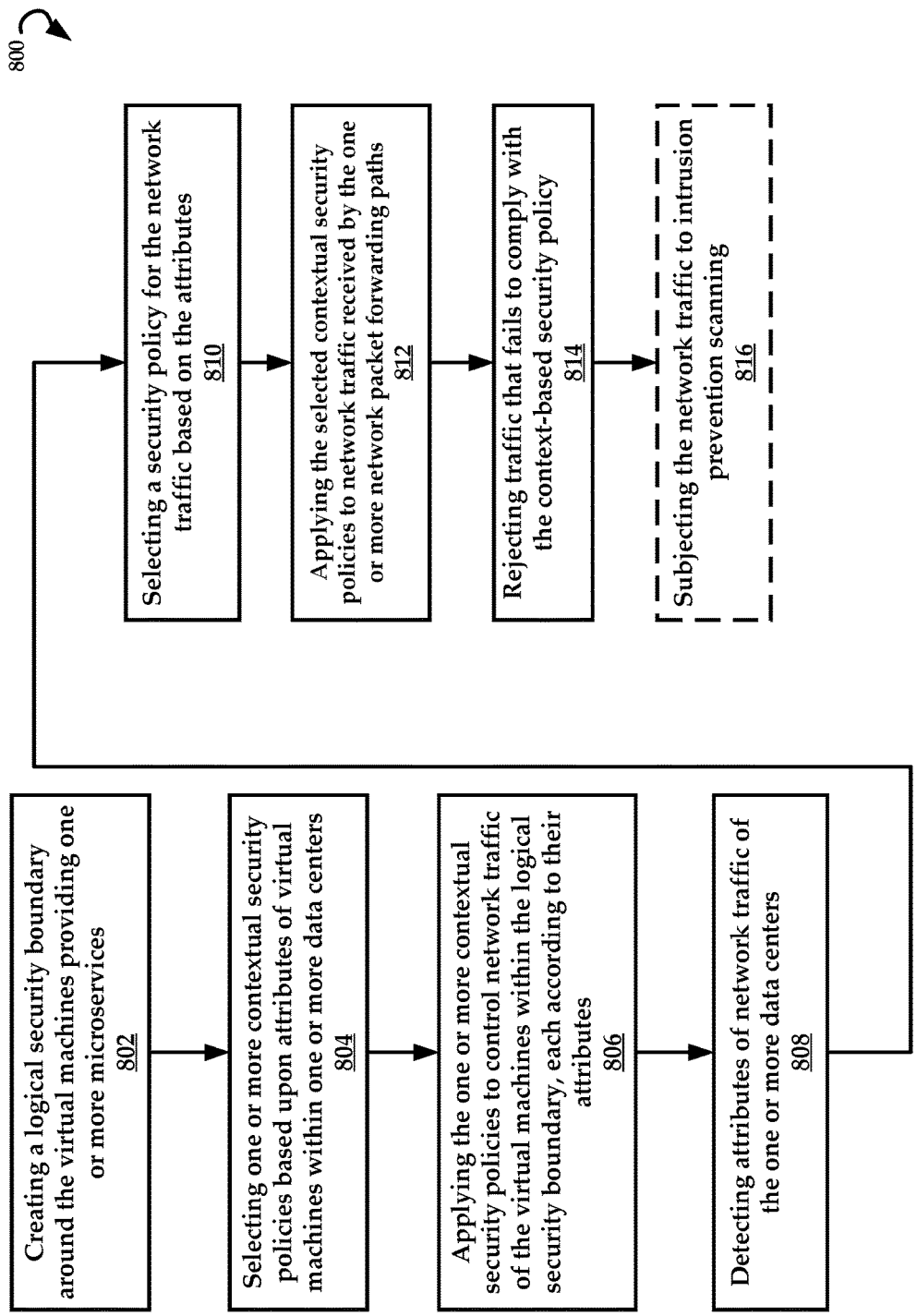
FIG. 8 is a flowchart of an example method for providing contextual security policies within a microsegmented data center.

FIG. 8 illustrates a flowchart of an example method of the present technology. The method 800 is executed with one or more data centers and specifically within context aware data centers with microsegmented services provided by physical or virtual machines.

In some embodiments, the method 800 includes creating 802 a logical security boundary around the virtual machines providing one or more microservices. For example, an enforcement point can be instantiated to create the logical security boundary around various virtual machines or, in some embodiments, microservices of the virtual machines.

Once the logical security boundary has been established, the method 800 includes selecting 804 one or more contextual security policies based upon attributes of virtual machines within one or more data centers. For example, the attributes of the virtual machines could include a location, a workload type or sensitivity (e.g., the workload involves protected or secure information), and so forth.

The enforcement point can evaluate the attributes of the virtual machines and select an appropriate context-based security policy that corresponds to a context for the virtual machines.

By way of example, one of the virtual machines within the logical security boundary is subject to different local security requirements such that an enforcement point applies a first contextual security policy to one or more of the virtual machines, while the enforcement point applies a second contextual security policy to different virtual machines. The first contextual security policy and the second contextual security policy are selected based on the attributes of the virtual machines.

Next, the method 800 includes applying 806 the one or more contextual security policies to control network traffic of the virtual machines within the logical security boundary, each according to their attributes. The step of applying could include, for example, applying data retention or destruction policies to the data generated by the virtual machines based on a privacy policy selected for the virtual machines based upon their respective locations. For example, a data retention or destruction policies for a virtual machine in Europe may differ from the data retention or destruction policies for a virtual machine operating in Canada. To be sure, this is merely an example of context aware security policies for microsegmented networks and should not be viewed as limiting.

The method 500 can also optionally apply context-based security policies to network traffic that enters and exits the data center. In other embodiments, the data center only comprises contextual security policies for logical security boundaries, and network traffic into and out of the data center is controlled by other security means.

The following steps are executed when applying context-based security policies to network traffic of a data center. Thus, in some embodiments, the method 800 comprises detecting 808 attributes of network traffic of the one or more data centers. For example, a central enforcement controller can be configured to determine attributes such as packet forwarding path number, packet size, client location, ISP reputation, network trust level (e.g., public or private network, LAN, WAN, cloud, and so forth), as well as other attributes that are similar, and/or combinations thereof.

The method 800 also includes selecting 810 a security policy for the network traffic based on the attributes. To be sure, the attributes define a context of the network traffic. Next, the method 800 includes applying 812 the selected contextual security policies to network traffic received by the one or more network packet forwarding paths.

In some embodiments, the method 800 includes rejecting 814 traffic that fails to comply with the context-based security policy and optionally subjecting 816 the network traffic to intrusion prevention scanning.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases in "one embodiment" or in "an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a," an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A context aware microsegmented network, comprising:
    an enforcement point creating a logical security boundary around at least a first and a second virtual machine collectively providing a microservice, the microservice comprising a first microservice component and a second microservice component, the first microservice component being provided by the first virtual machine, the second microservice component being provided by the second virtual machine, the enforcement point configured to:
        select at least a first and a second contextual security policy based upon attributes of the first and the second virtual machines respectively; and
        apply at least one of the first and the second contextual security policies to control network traffic of the first and the second virtual machines within the logical security boundary based on the attributes of the first and the second virtual machines; and
    a central enforcement controller that:
        determines a packet forwarding path for the enforcement point;
        selects a third contextual security policy based on at least one of a location of the enforcement point and security attributes of the enforcement point; and
        applies the third contextual security policy to network traffic into and out of the logical security boundary received by at least one of the location of the enforcement point or the packet forwarding path.

2. The context aware microsegmented network according to claim 1, wherein the attributes of the first and the second virtual machines comprise a location of a data center where the first and second virtual machines reside.

3. The context aware microsegmented network according to claim 1, wherein the first and the second virtual machines are physically collocated in a data center.

4. The context aware microsegmented network according to claim 1, wherein the enforcement point is a virtual machine.

5. The context aware microsegmented network according to claim 1, wherein network traffic that violates at least of the first contextual security policy, the second contextual security policy, and the third contextual security policy is rejected.

6. The context aware microsegmented network according to claim 1, wherein network traffic that violates at least one of the first contextual security policy, the second contextual security policy, and the third contextual security policy is subjected to intrusion prevention scanning.

7. The context aware microsegmented network according to claim 1, wherein the first virtual machine within the logical security boundary is subject to different local security requirements, the different local security requirements manifesting in the first contextual security policy.

8. The context aware microsegmented network according to claim 1, wherein the first virtual machine is located in a first country and the second virtual machine is located in a second country, wherein the first country is subject to a first set of security requirements manifesting in the first contextual security policy and the second country is subject to a second set of security requirements manifesting in the second contextual security policy.

9. The context aware microsegmented network according to claim 1, wherein the central enforcement controller further inspects the network traffic into and out of the logical security boundary for malicious behavior by performing a stateful inspection of the network traffic.

10. The context aware microsegmented network according to claim 1, wherein the enforcement point quarantines at least one of the first and the second virtual machines when network traffic associated with a respective one of the first and the second virtual machines violates one or more of the first, the second and the third contextual security policies.

11. The context aware microsegmented network according to claim 1, wherein the enforcement point measures network traffic associated with one of the first and the second virtual machines and determines the measured network traffic is indicative of malicious behavior.

12. The context aware microsegmented network according to claim 11, wherein the determining includes comparing the measured network traffic to traffic rules, the traffic rules being included in at least one of the first, the second, and the third contextual security policies.

13. The context aware microsegmented network according to claim 11, wherein the enforcement point further provides a warning for the malicious behavior when the malicious behavior is determined.

14. A method for context aware security policy enforcement, the method comprising:
    selecting, by an enforcement point, at least a first and a second contextual security policy based upon attributes of at least a first and a second virtual machine respectively, the at least first and second virtual machines collectively providing a microservice, the microservice comprising a first microservice component and a second microservice component, the first microservice component being provided by the first virtual machine, the second microservice component being provided by the second virtual machine;

applying, by the enforcement point, at least one of the first and the second contextual security policies to control network traffic of the first and the second virtual machines within a logical security boundary based on the attributes of the first and the second virtual machines;

determining, by a central enforcement controller, a packet forwarding path for the enforcement point;

selecting, by the central enforcement controller, a third contextual security policy based on at least one of a location of the enforcement point and security attributes of the enforcement point; and applying, by the central enforcement controller, the third contextual security policy to network traffic into and out of the logical security boundary received by at least one of the location of the enforcement point or the packet forwarding path.

15. The method according to claim 14, wherein the attributes of the first and the second virtual machines comprise a location of a data center where the first and the second virtual machines reside.

16. The method according to claim 14, wherein the first and the second virtual machines are physically collocated in a data center.

17. The method according to claim 14, wherein the enforcement point is a virtual machine.

18. The method according to claim 14, further comprising rejecting network traffic that violates at least one of the first contextual security policy, the second contextual security policy, and the third contextual security policy.

19. The method according to claim 14, further comprising subjecting network traffic that violates at least one of the first contextual security policy, the second contextual security policy, and the third contextual security policy to intrusion prevention scanning.

20. The method according to claim 14, further comprising subjecting the first virtual machine within the logical security boundary to different local security requirements, the different local security requirements manifesting in the first contextual security policy.

21. The method according to claim 14, wherein the first virtual machine is located in a first country and the second virtual machine is located in a second country, wherein the first country is subject to a first set of security requirements manifesting in the first contextual security policy and the second country is subject to a second set of security requirements manifesting in the second contextual security policy.

22. The method according to claim 14, wherein the central enforcement controller further inspects the network traffic into and out of the logical security boundary for malicious behavior by performing a stateful inspection of the network traffic.

23. The method according to claim 14, further comprising quarantining at least one of the first and the second virtual machines when network traffic associated with a respective one of the first and the second virtual machines violates one or more of the first, the second and the third contextual security policies.

24. The method according to claim 14, further comprising:
    measuring network traffic associated with one of the first and the second virtual machines; and
    determining the measured network traffic is indicative of malicious behavior.

25. The method according to claim 24, wherein the determining includes comparing the measured network traffic to traffic rules, the traffic rules being included in at least one of the first, the second, and the third contextual security policies.

26. The method according to claim 24, further comprising:
    providing a warning for the malicious behavior when the malicious behavior is determined.

27. A non-transitory computer-readable storage medium having embodied thereon a program, the program being executable by a processor to perform a method, the method comprising:
    selecting, by an enforcement point, at least a first and a second contextual security policy based upon attributes of at least a first and a second virtual machine respectively, the at least first and second virtual machines collectively providing a microservice, the microservice comprising a first microservice component and a second microservice component, the first microservice component being provided by the first virtual machine, the second microservice component being provided by the second virtual machine;
    applying, by the enforcement point, at least one of the first and the second contextual security policies to control network traffic of the first and the second virtual machines within a logical security boundary based on the attributes of the first and the second virtual machines;
    determining, by a central enforcement controller, a packet forwarding path for the enforcement point;
    selecting, by the central enforcement controller, a third contextual security policy based on at least one of a location of the enforcement point and security attributes of the enforcement point; and
    applying, by the central enforcement controller, the third contextual security policy to network traffic into and out of the logical security boundary received by at least one of the location of the enforcement point or the packet forwarding path.

* * * * *